(12) United States Patent
Luo

(10) Patent No.: US 8,435,467 B2
(45) Date of Patent: May 7, 2013

(54) PROCESS FOR PREPARING AMMONIUM METATUNGSTATE

(75) Inventor: Zhangqing Luo, Jiangxi (CN)

(73) Assignee: Jiangxi Rare Earth and Rare Metals Tungsten Group Corporation, Jiangxi (CN)

( * ) Notice: Subject to any disclaimer, the term of this patent is extended or adjusted under 35 U.S.C. 154(b) by 0 days.

(21) Appl. No.: 13/388,896

(22) PCT Filed: Dec. 30, 2009

(86) PCT No.: PCT/CN2009/076283
§ 371 (c)(1),
(2), (4) Date: Feb. 28, 2012

(87) PCT Pub. No.: WO2011/015021
PCT Pub. Date: Feb. 10, 2011

(65) Prior Publication Data
US 2012/0141359 A1    Jun. 7, 2012

(30) Foreign Application Priority Data
Aug. 5, 2009    (CN) .......................... 2009 1 0089165

(51) Int. Cl.
*C01G 41/00* (2006.01)
(52) U.S. Cl.
USPC ....................................... 423/56; 423/594.13

(58) Field of Classification Search ................. 423/55, 423/56, 594.13
See application file for complete search history.

(56) References Cited

U.S. PATENT DOCUMENTS 4,557,923 A * 12/1985 Powers et al. ............ 423/594.13
7,794,686 B2 * 9/2010 White ...................... 423/594.13

FOREIGN PATENT DOCUMENTS

CN    1986425    *  6/2007

OTHER PUBLICATIONS

Liu, Yongsheng et al., Process and Benefit of Nitric Acid Neutralisation Method for Preparing Ammonium Metatungstate, Anhui Chemical Industry, Aug. 1995, No. 4, pp. 15-17.*
Lu, Jijue et al., Conversion Process for Preparing Ammonium Metatungstate by Continuously Dissolving Ammonium Paratungstate, China Tungsten Industry, Jul. 1996, No. 7, pp. 5-8.*
Machine Translation of CN 1986425A, Jun. 27, 2007.*

* cited by examiner

*Primary Examiner* — Steven Bos
(74) *Attorney, Agent, or Firm* — Hammer & Associates, P.C.

(57) ABSTRACT

A process for preparing ammonium metatungstate using ammonium paratungstate as raw material comprising: (A) leaching wet ammonium paratungstate with nitric acid to obtain a dilute solution of ammonium metatungstate; (B) concentrating the dilute solution of ammonium metatungstate to be a concentrated solution of ammonium metatungstate; and (C) spray-drying the concentrated solution of ammonium metatungstate to obtain powder of ammonium metatungstate.

6 Claims, 2 Drawing Sheets

PROCESS FOR PREPARING AMMONIUM METATUNGSTATE

TECHNICAL FIELD

The present invention relates to a process for preparing ammonium metatungstate from ammonium paratungstate as a raw material, particularly to a method for preparing an ammonium metatungstate product with a low content and a high solubility.

The term "low content" as used herein refers to a tungsten oxide content of 82 to 85% in ammonium metatungstate, and the term "high solubility" as used herein refers to a solubility of the ammonium metatungstate product higher than 300 g/mL.

PRIOR ART

Ammonium metatungstate is an important tungsten-containing compound, mainly used as catalyst in petroleum cracking, organic synthesis, nitration, and so on. With the rapid development of petroleum refining, petrochemical engineering and other industries, the ammonium metatungstate usage is increasing very fast. In the prior art, ammonium paratungstate is used as a raw material, and a crystallization process is utilized for the preparation of ammonium metatungstate. This process is expensive, costly and energy-consuming. The obtained product is unstable in quality, particularly the solubility is poor, especially for the ammonium metatungstate product with a low content, while ammonium metatungstate product with a lower solubility cannot meet the needs for the production of tungsten-containing catalysts.

SUMMARY OF THE INVENTION

In order to overcome the shortcomings of the prior art, an object of the present invention is to provide a process for preparing ammonium metatungstate, which produces ammonium metatungstate product from ammonium paratungstate with a short process and a less investment for equipment.

Another object of the present invention is to provide a process for preparing ammonium metatungstate from ammonium paratungstate as a raw material, the ammonium metatungstate product of which has a high solubility and is stable in quality.

Yet another object of the present invention is to provide a process for preparing ammonium metatungstate from ammonium paratungstate as a raw material, the energy consumption of which is low, so as to be cost-efficiently.

The technical solution of the invention is that, ammonium paratungstate is used as a raw material and subjected to the following three steps to produce ammonium metatungstate: the leaching of wet ammonium paratungstate, the conversion of dilute solution of ammonium metatungstate to concentrated solution of ammonium metatungstate, and the spray-drying of the concentrated solution of ammonium metatungstate. The preparation method of this invention is as follows:

A. The leaching of wet ammonium paratungstate: wet ammonium paratungstate (moisture content is 5 to 10%) is used as the raw material for mixing with dilute nitric acid ($HNO_3$) to produce a dilute solution of ammonium metatungstate. The chemical reaction is as follows:

$$5(NH_4)_2O.12WO_3.5H_2O+4HNO_3 = (NH_4)_6H_2W_{12}O_{40}.6H_2O+4NH_4NO_3$$

B. The conversion of dilute solution of ammonium metatungstate to concentrated solution of ammonium metatungstate: the dilute solution of ammonium metatungstate prepared in step A is standing aged, filtered, heated, concentrated, and re-filtered for several times to produce a concentrated solution of ammonium metatungstate.

C. The spray-drying of the concentrated solution of ammonium metatungstate: the concentrated solution of ammonium metatungstate prepared in step B is spray-dried, so that the liquid material is quickly dried into a powdery material.

According to the preparation method of the present invention, in the step of the leaching of wet ammonium paratungstate, the wet ammonium paratungstate is reacted directly with nitric acid to produce a dilute solution of ammonium metatungstate. In comparison with the prior art, the calcining process is prevented, so it is no longer necessary to use the rotary furnace equipment, thus the fixed investment is reduced, electric power needed is reduced by 120 kWh per ton of product, actual yield can be increased by 3%, and production cost is lowered.

According to the preparation method of the present invention, in the step of the spray-drying of the concentrated solution of ammonium metatungstate, the drying conditions (for example: inlet air temperature, outlet air temperature, and feeding speed) are controlled, such that the concentrated solution of ammonium metatungstate is rapidly dried into a powder with a high speed and a high efficiency, as a result, the ammonium metatungstate product has good flowability and good solubility as well as high purity. The ammonium metatungstate product produced according to the present invention has overcome the shortcoming of low solubility of the ammonium metatungstate produced by the prior art.

According to the invention, a fresh wet ammonium paratungstate product is used as a raw material, and is fed in a slow continuous way, thus the problem with low solubility of ammonium paratungstate is addressed, and an ammonium metatungstate solution with a higher content of tungsten oxide can be produced, thus the calcining process can be omitted, while a wet ammonium paratungstate product is used as the raw material, eliminating the need for drying ammonium paratungstate product, packaging and other processes, so as to save energy and lower cost.

According to the invention, a dilute nitric acid of 1:3 is used as the leaching agent, overcoming the disadvantage that over acidity is easily formed locally when concentrated nitric acid is used as the leaching agent, while local over acidity tends to produce tungstic acid, thus the product of the invention has a high conversion rate, and the crystallization product has a good solubility.

BRIEF DESCRIPTION OF ACCOMPANYING DRAWINGS

DETAILED DESCRIPTION OF PREFERRED EMBODIMENTS

Figures 1A, 1B:
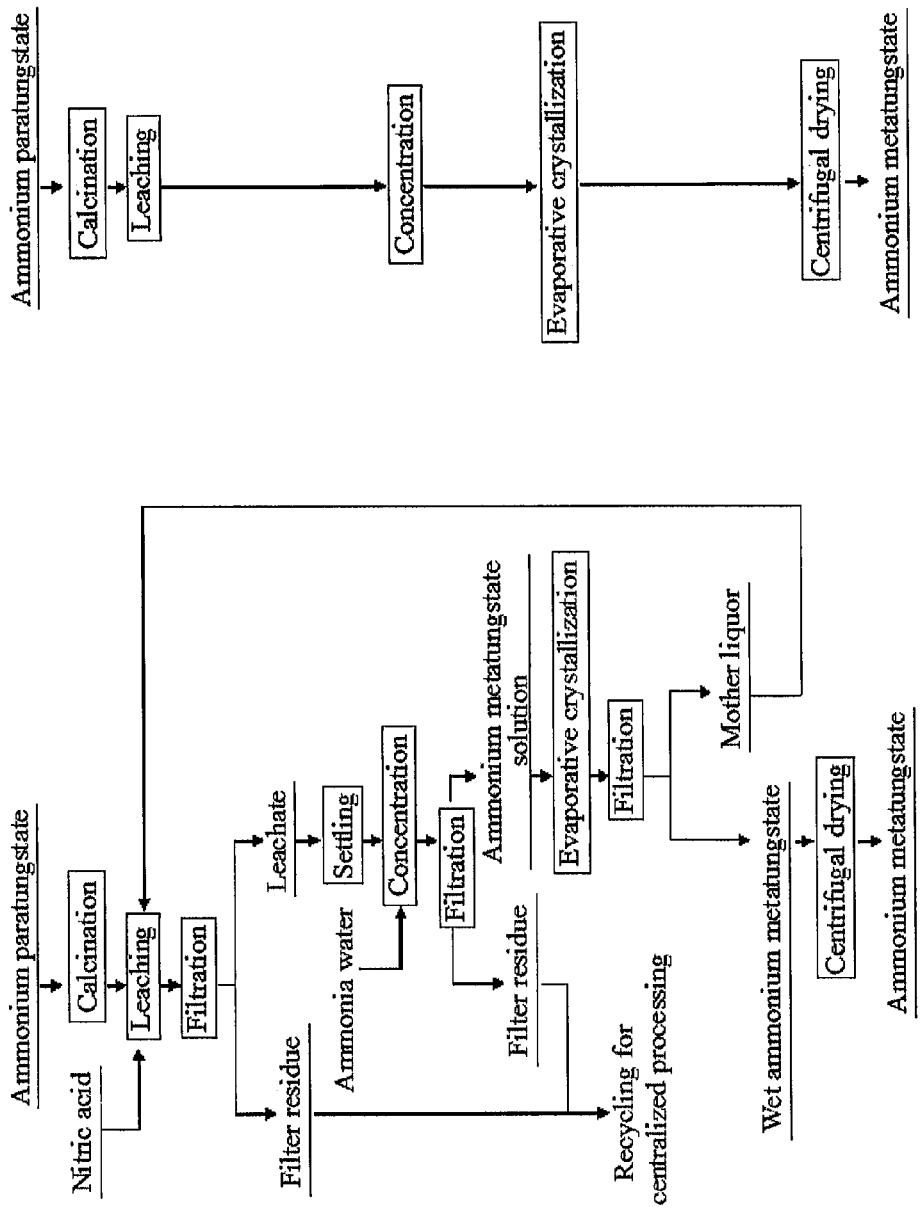
FIG. 1A is the flowchart of a process of the prior art which produces ammonium metatungstate from ammonium paratungstate as a raw material.
FIG. 1B is a brief diagram of the process as shown in FIG. 1A.
Figure 2B:
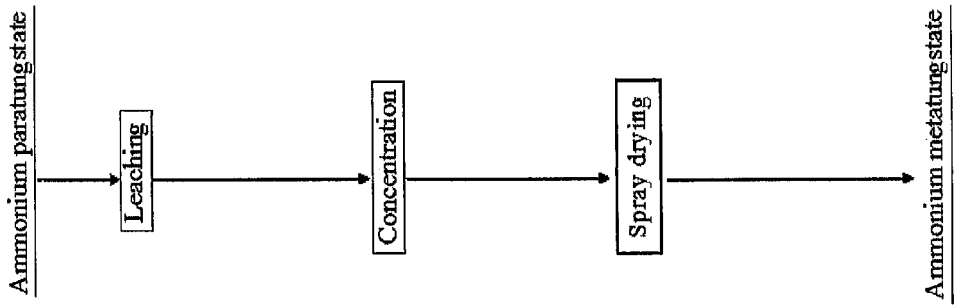
FIG. 2B is a brief diagram of the process as shown in FIG. 2A.
Figure 2A:
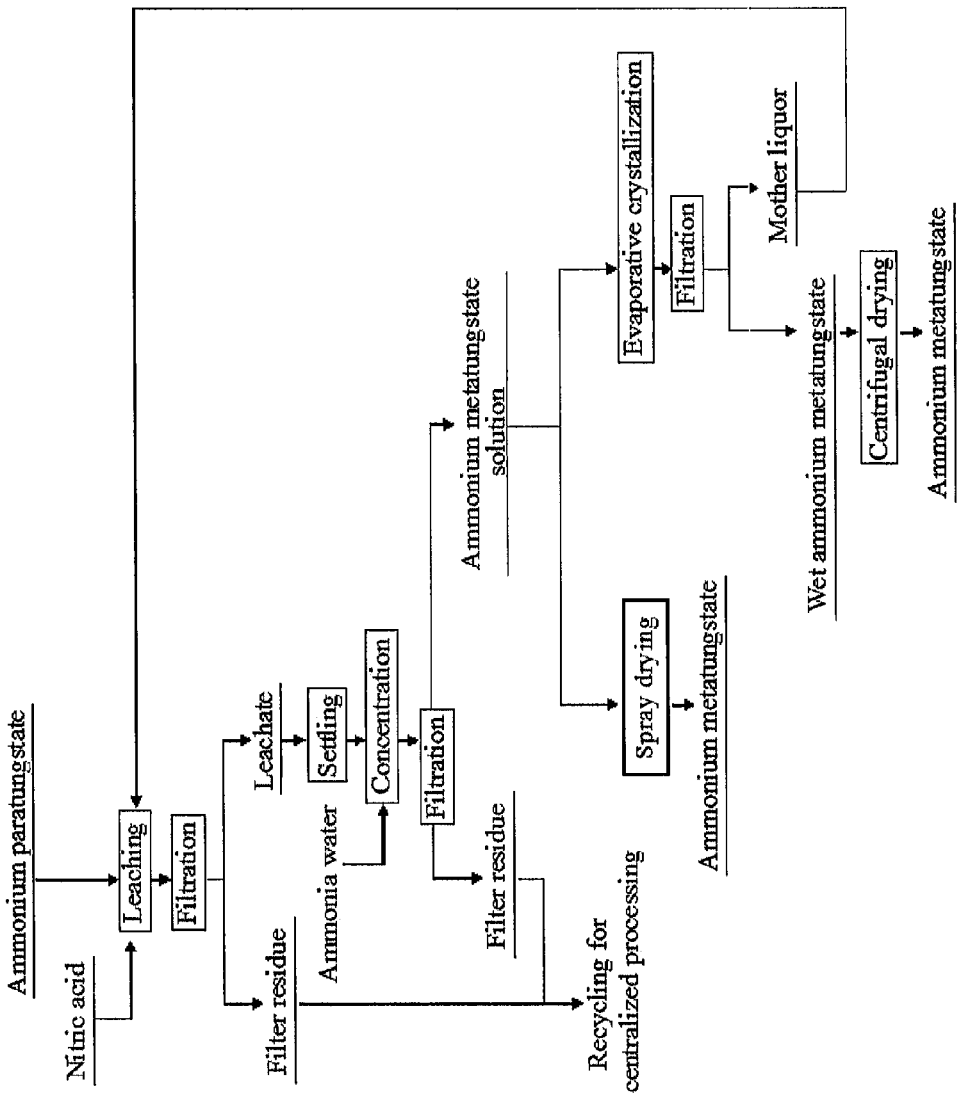
FIG. 2A is the flowchart of a process for preparing ammonium metatungstate product with a high solubility according to the present invention.

Further description of the present invention is given below with examples.

A. The leaching of wet ammonium paratungstate: Pure water (electric conductivity ≦10 us/cm) is added to a reactor and preheated to boiling; wet ammonium paratungstate [5(NH$_4$)$_2$O.12WO$_3$.5H$_2$O] is added slowly to the pure water at a speed of 150 to 200 Kg/h while stirring; when adding the wet ammonium paratungstate, a 1:3 dilute nitric acid (HNO$_3$) is added slowly to control the solution at pH 3 to 5; the above process is stopped when the WO$_3$ content of the solution reaches 150 g/l; After boiling and being stirred for half an hour, the materials are allowed to pass through a suction filter for natural filtration, in order to produce a dilute solution of ammonium metatungstate.

B. The conversion of dilute solution of ammonium metatungstate to concentrated solution of ammonium metatungstate: the dilute solution of ammonium metatungstate from step A is standing aged for 4 hours, followed by a primarily natural filtration to obtain a filtrate 1; the above filtrate 1 is pumped into a reactor in multiple times for heating to concentrate it, each time the filtrate 1 is pumped, a dilute ammonia water (NH$_3$.H$_2$O) of 1:5 is used to adjust the solution at pH 3 to 4; when the density of the solution reaches 2, the pumping of the filtrate 1 is stopped, following 1 hour of cooling, the materials are allowed to pass through a suction filter for a secondarily natural filtration to obtain a filtrate 2; the above filtrate 2 is pumped into a settling tank, standing aged for 8 hours, then the materials are allowed to pass through a suction filter for a tertiarily natural filtration to obtain a concentrated solution of ammonium metatungstate.

C. The spray-drying of the concentrated solution of ammonium metatungstate: The concentrated solution of ammonium metatungstate from step B is dried into a powdery product of ammonium metatungstate by the use of homemade advanced high-speed centrifugal spray-drying equipment or a spray atomizing dryer. The conditions for spray-drying are controlled at: inlet air temperature 220 to 280° C., outlet air temperature 110 to 160° C., and feeding speed 300 to 400 kg/h.

The invention claimed is:

1. A process for preparing ammonium metatungstate comprising the steps of:
    A. leaching of wet ammonium paratungstate by slowly adding wet ammonium paratungstate to stirred pure water while slowly adding a 1:1 to 1:4 nitric acid (HNO$_3$) solution to control the solution at pH 3 to 5 for the occurrence of the following reaction:

$$5(NH_4)_2O.12WO_3.5H_2O+4HNO_3 = (NH_4)_6H_2W_{12}O_{40}.6H_2O+4NH_4NO_3$$

when WO$_3$ content of the solution reaches 130 to 160 g/L, the solution is stirred and boiled for 20 minutes or more, and then filtered to obtain a dilute solution of ammonium metatungstate;

B. converting the dilute solution of ammonium metatungstate to a concentrated solution of ammonium metatungstate by
    standing and aging the dilute solution of ammonium metatungstate for 2 to 6 hours,
    filtering the aged dilute solution of ammonium metatungstate to obtain a first filtrate,
    concentrating the first filtrate by heating, in a reactor, with ammonia water having a concentration in the range of 1:4 to 1:6 to adjust the first filtrate to a pH in the range of 3-4, repeating the heating step until the first filtrate reaches a density in the range of 1.8-2.2, and
    thereafter cooling the first filtrate for 1-4 hours,
    filtering the first filtrate to obtain a second filtrate,
    standing and aging the second filtrate, in a settling tank, for 5-12 hours, and
    filtering, via a suction filter, the second filtrate to obtain a concentrated solution of ammonium metatungstate; and
    C. spray-drying of the concentrated solution of ammonium metatungstate into a powdery ammonium metatungstate with a high-speed centrifugal spray-dryer or a spray atomizing dryer.

2. The process according to claim 1 wherein said wet ammonium paratungstate is a freshly crystallized wet ammonium paratungstate with a moisture content of 5 to 10%.

3. The process according to claim 1 wherein the wet ammonium paratungstate is added in a slow and continuous way.

4. The process according to claim 1, wherein said step of spray-drying further comprising drying conditions where an inlet air temperature being in a range of 220 to 280° C., an outlet air temperature being in a range of 110 to 160° C., and a feeding speed being in a range of 300 to 400 kg/h.

5. The process according to claim 4 wherein said step of spray-drying uses a high-speed centrifugal spray-dryer.

6. The process according to claim 4 wherein said step of spray-drying uses a spray atomizing dryer.

* * * * *